United States Patent [19]

Kawada et al.

[11] 4,176,361

[45] Nov. 27, 1979

[54] INK COMPOSITION FOR INK JET PRINTING

[75] Inventors: Hiroh Kawada; Kiyoshi Goto; Yoshio Kurita, all of Hino, Japan

[73] Assignee: Konishiroku Photo Industry Co., Ltd., Tokyo, Japan

[21] Appl. No.: 685,629

[22] Filed: May 12, 1976

[30] Foreign Application Priority Data

May 22, 1975 [JP] Japan .................................. 50-61691

[51] Int. Cl.$^2$ ...................... C09D 11/00; G01D 9/00; G01D 15/20
[52] U.S. Cl. ...................................... 346/1.1; 106/20; 106/21; 106/22; 106/23; 346/140 R
[58] Field of Search .................................... 106/20–23; 346/1, 140 R

[56] References Cited

U.S. PATENT DOCUMENTS

| 3,519,443 | 7/1970 | Kaplan et al. | 106/22 |
| 3,705,043 | 12/1972 | Zabiak | 106/20 |
| 3,705,045 | 12/1972 | Nadolski | 106/22 |
| 3,779,780 | 12/1973 | Dyson | 106/27 |
| 3,846,141 | 11/1974 | Ostergren et al. | 106/22 |

FOREIGN PATENT DOCUMENTS

47-00251  6/1972 Japan ......................................... 106/22

*Primary Examiner*—Allan Lieberman
*Attorney, Agent, or Firm*—Lane, Aitken & Ziems

[57] ABSTRACT

Disclosed is an aqueous ink composition useful for ink jet printing, which comprises 2–12 wt % of a water soluble dye, 35–80 wt % of a polyhydric alcohol having 2–6 carbon atoms.

4 Claims, No Drawings

INK COMPOSITION FOR INK JET PRINTING

BACKGROUND OF THE INVENTION

This invention relates to an ink composition for ink jet printing, and more particularly to an aqueous ink composition for use in an ink jet printing system of a type which involves projecting an ink from a small nozzle by rapidly or instantaneously reducing an inner volume of an ink-holding container.

An ink jet printing system of the type mentioned above is known, for example, in British Patent Specification No. 1,350,836. Broadly speaking, the jet system of the British patent specification includes the following two steps: first, an inner volume of a small container filled with an ink is rapidly or instantaneously reduced by means of an electric driving pulse to force the ink droplet to be projected from a nozzle tip so that one ink droplet is deposited on recording paper every driving pulse (first step); and after completion of the jetting, the system is entirely then returned to an initial state and stands ready for a subsequent jet operation (second step).

Ink compositions to be employed in the ink jet printing system of the class just mentioned should meet at least the following characteristic requirements similarly to inks for use in other types of ink jet recording systems:

1. Being free from clogging in the nozzle.
2. Ensuring a sharp contrast upon recording.
3. Neither changing in physical property nor producing any precipitates during storage.

In addition, it is found that the ink for use in the ink jet system of the above-mentioned type is essentially required to have suitable ranges of a viscosity and a surface tension so as to attain a satisfactory ink jet recording. Particularly, the viscosity of an ink gives a great influence on the recording. For example, when an ink is used having a viscosity outside a suitable range which is usually determined depending on the type of an employed apparatus and the kind of electric driving pulses to be input, the above-mentioned first and second steps do not proceed smoothly by the reasons described hereinbelow, it being thus difficult to effect the ink jet recording satisfactorily. That is, with an ink having a viscosity below a suitable range, it is almost impossible in the first step to correct a speed variation or deviation in the respective portions of an elongated ink droplet being ejected from a nozzle tip. As a consequence, two or more ink droplets with different velocities are undesirable projected in correspondence with one electric driving pulse. If the nozzle tip is positioned at a relatively great distance from a recording medium, the two or more droplets are deposited on the recording medium in different points to form corresponding different dots thereon, lowering the quality of the resulting print or image considerably. Further, an ink having a viscosity below a suitable range also impedes a smooth operation in the second step. That is, after completion of the jetting of the ink droplet, an ink meniscus is temporarily lowered by the reaction of the ink jetting. The meniscus then rises or is returned to an original state by the action of capillary force. In this connection, however, if the ink viscosity is too low, the ink does not satisfactorily serve as a damper. Thus, it undesirable takes a relatively long period of time until the ink meniscus settles down in an equilibrium position. This is because the ink meniscus will pass over a level of the nozzle tip and be then pulled down by the action of surface tension force, repeating the vibration damping type behavior so as to restore a standstill position thereof. On the contrary, with an ink having too high viscosity, it does not show any vibration damping type behavior, but requires a long period of time before being pulled back by the action of capillary force. In either case, the returning to an initial or ready-to-jet state of the ink takes an unfavorably long period of time, lowering a printing speed.

A number of ink composition for ink jet printing have been heretofore proposed but most of them fall short of one or more of the above-mentioned requirements and have thus inherent disadvantages which must be overcome. For example, there is known an ink composition to which is added a water-soluble thickener so as to maintain a viscosity of the composition at a desired viscosity. However, the water-soluble thickener which includes, for example, a cellulose derivative such as hydroxylpropyl cellulose, carboxylmethyl cellulose, hydroxylethyl cellulose, methyl cellulose or the like, or polyvinyl alcohol tends to change a viscosity of the ink composition or, in some cases, to produce precipitates during storage in combination with a water-soluble dye or coloring agent. This is practically disadvantages in the application to the ink jet system in which the change in the viscosity exerts a detrimental influence in carrying out the process of the system. In the ink jet system, it is general to use a nozzle with a diameter as small as 30 to 200$\mu$. With such fine nozzle construction, the nozzle is readily clogged due to precipitation of solid matter resulting from evaporation of solvent when the composition is present or stayed in the nozzle. Further, the air corresponding to the amount of an evaporated solvent may enter a nozzle tip and remain in a head as bubbles. This will impede a sharp ink jet response to an inner volume change caused by an electric driving pulse. As a result, no injection of an ink takes place, or the injection conditions or state varies with a lapse of time, so that it becomes difficult to effect the recording in a stable state.

Moreover, the U.S. Pat. No. 3,705,043 discloses an aqueous ink composition which includes 1 to 8% by weight of a water-soluble dye and 5 to 30% by weight of a wetting agent such as polyethylene glycol, polypropylene glycol, ethylene glycol, propylene glycol, diethylene glycol, glycerol or the like. However, such small amount of the wetting agent is not sufficient to maintain the composition in a viscosity range required for the intended ink jet system. In addition, even with the aqueous ink composition, it is hard to prevent both the nozzle from being clogged and the air from entering the nozzle tip.

BRIEF SUMMARY OF THE INVENTION

An object of the present invention is to provide an ink composition which overcomes the above-mentioned disadvantages.

Another object of the present invention is to provide an ink composition which is free from the clogging of a nozzle tip.

A further object of the present invention is to provide an ink composition which does neither change in physical property nor produce any precipitate during storage and which ensures a satisfactory contrast upon recording.

A still further object of the invention is to provide an ink composition whereby stable and clear recording prints can be obtained without any troubles over a long period of operation time or even after a long period of residence time.

DETAILED DESCRIPTION OF THE INVENTION

The above objects can be achieved by an aqueous ink composition which comprises 2 to 12% by weight of a water-soluble dye, 35 to 80% by weight of a polyhydric alcohol containing from 2 to 6 carbon atoms, and water. The aqueous ink composition has a viscosity of 4 to 20 centipoises at 25° C. and meets all the characteristic requirements mentioned hereinbefore.

The water-soluble dyes useful in the present invention are those which are soluble in a solvent system composed of the polyhydric alcohol and water, in an amount above 2% by weight based on the solvent system. With monochromic recording, black or blue dyes are preferred so as to render great a contrast on recording paper. Black dyes are, for example, C.I. Direct Black 17, 38 and 51, C.I. Acid Black, 2, 7, 24, 31, 52, 107, 118, 119 and 156, and blue dyes are C.I. Direct Blue 1, 6, 15, 25, 71, 86 and 226, C.I. Acid Blue 9, 62, 102, 104, 113, 117, and 120, C.I. Basic Blue 1, 3, 5, 7, 9 and 28, and the like. These may be used singly or in combination. The amount of the dye is not particularly important so far as it is within a range sufficient to offer a clear contrast upon application onto recording paper. With the amount below 2 wt %, applied dye spots or dots on recording paper becomes unclear when the size of injected ink droplets is too small. While, the amount above 12 wt % is not necessary in practical application and is rather unfavorable since the dye dissolved in such large amount tends to be precipitated by evaporation of the solvent system though the tendency is dependent on a composition of the solvent system.

Examples of the polyhydric alcohols suitable for the practice of the invention are ethylene glycol, propylene glycol, trimethylene glycol, glycerine, 1,3-butanediol, 2,3-butanediol, 1,4-butanediol, diethylene glycol, 1,5-pentanediol, hexylene glycol, triethylene glycol, dipropylene glycol, 1,2,6-hexanetriol and the like. These polyhydric alcohols may be used singly or in combination. All of the above-mentioned polyhydric alcohols are miscible with water in any arbitrary ratio and play an important role in the ink composition of the invention to satisfy the afore-mentioned characteristic requirements because of their inherent properties such as high hygrospicity, low vapor pressure and high thickening property. The amount of the polyhydric alcohol varies depending on a desired viscosity of the ink composition, the amount and kind of the water-soluble dye and the degree of reducing or preventing the nozzle from being clogged or the air from entering the nozzle. In order to meet the afore-mentioned requirements, the amount is required to be in the range of from 35 to 80% by weight of the ink composition. With the amount below 35 wt %, the ink composition results, in most cases, in lower viscosity than the defined range and the nozzle clogging and bubble entering can not be prevented satisfactorily though the viscosity and preventing effects may vary depending on the amount of dyes and the kind of polyhydric alcohols. On the contrary, use of the polyhydric alcohol in an amount above 80 wt % will undesirably increase the viscosity of the ink composition. In either case, the amount of the polyhydric alcohol outside the above-defined range may cause infeasibility of printing, reduction in printing speed and production of defective printed matter.

As will be understood from the above, the ink composition of the invention comprises a water-soluble dye and a polyhydric alcohol in the form of an aqueous solution. In addition thereto, the ink composition may further comprise various kinds of additives, if necessary. For example, if it is assumed that it takes a long period of storage time before the ink composition is actually used, the composition may be added with an antiseptic so as to prevent or reduce the growth of bacteria therein. A number of antiseptics are known to be useful for this purpose, of which Dioxine is preferable. The amount of the antiseptic is generally below 1% by weight, preferably in the range of 0.01 to 0.5% by weight, of the total amount of the ink composition.

Further, surface active agents may be added to the ink composition of the invention in order to improve the surface tension of the ink and the "wetting" of the ink to ink passages. Any surface active agents may be used without restriction unless they react with the dye employed. Non-ionic active agents are preferred including commercially available polyoxyalkylenes and alkyl ethers thereof, siloxane-oxyalkylene copolymers (L-5340, product of Union Carbide Co.), fluorine-containing surface active agents (FC—430, product of 3M Co.), and the like. These surface active agents are generally used in an amount below 1% by weight, preferably 0.05 to 0.5% by weight, of the total amount of the ink composition.

In order to prepare the ink composition of the invention, it is important to mix the composition uniformly under agitating conditions sufficient to dissolve the water-soluble dye. Further, after completion of the mixing, it is desirable to provide a filtration step for removing insoluble matters from the uniform mixture. If the solid and fine particulate matters such as insoluble dye and dust or contaminant from outside are not removed by filtration, the smooth passage of the ink composition through a nozzle upon application may be impeded, resulting in no or abnormal injection of the ink.

In order to overcome the impedient, it is preferable to remove solid particulates with a size above $5\mu$, preferably above $1\mu$ though the size may vary depending on the diameter of an employed nozzle. A filter medium is properly selected depending on the size of solid particulates to be removed. Representative of the filter medium is, for example, "fluorinert FA" (membrane filter made of polyfluoroethylene and produced by Millipore Co.).

In practicing the invention, it is also desirable that the ink be prepared without dissolving therein a large amount of air. If a large amount of air is dissolved in the ink composition, air bubbles may be produced during the residence of the ink composition in a print head, hindering a normal ink injection and thus making it difficult to effect a stable recording operation by the reasons described hereinbefore. In this connection, however, it is general that a small amount of air is inevitably dissolved in the ink composition during the course of the production process under agitating conditions. The dissolved air should preferably be removed by a suitable method such as degassing by placing the ink composition under reduced pressure. Though the degassing may be effected either prior to or after the filtration step, it is preferable to degas after the filtration step since air may be dissolved in the filtration step.

The present invention will be particularly illustrated by way of the following examples.

EXAMPLE 1

640 g of ethylene glycol and 319 g of distilled water were placed in a 2 l Erlenmeyer flask equipped with an agitator, to which was further added 1 g of dioxine with agitation. After the dioxine had been completely dissolved in the system, 40 g of Nigrosine dye (C.I. Acid Black 2) was gradually added to the solution with agitation, followed by agitation for further 2 hours at room temperature. The resulting solution was fed to a filter having a fluorinert filter medium having pore size of 1.0μ by means of a pressure pump to filter at a rate of 20 ml per min. The filtrate was then placed in a 2 l pressure vessel which had been cleaned by washing. The inner pressure of the vessel was reduced to about 20 mmHg by means of an aspirator and maintained at the same level for 10 min for degassing, after which the inner pressure was gradually returned to a normal pressure to obtain an ink. The thus obtained ink had the following composition, viscosity and surface tension.

| Composition: ethylene glycol | 64.0 wt % |
| --- | --- |
| distilled water | 31.9 wt % |
| Nigrosine | 4.0 wt % |
| Dioxine | 0.1 wt % |
| Viscosity: 7.03 c.p.s. (25° C.) | |
| Surface Tension: 47.7 dynes/cm (25° C.) | |

Then, the jet recording was effected by the use of an apparatus described on the British Patent Specification No. 1,350,836 (particularly shown in FIGS. 1-3 and described at line 28 on page 2 to line 94 on page 3). That is, the ink was poured in the apparatus having the following parameters for jet recording. As a result, clear black printed matters with a high contrast could be obtained. No change in quality occurred when the jet recording was continued over 24 hours. Further, when the recording was again effected 3 weeks after completion of the first recording, no abnormality such as clogging of nozzle was recognized, with printed matters with such invariable and high quality as those obtained in the first recording operation.

| Parameters: | |
| --- | --- |
| printing rate | 2000 dots/sec |
| static pressure | 0.006 psi |
| peak pulse pressure | 4.83 psi |
| pulse voltage | 65 V |
| pulse width | 135 $\mu_s$ |
| orifice diameter | 0.0028 inches |

EXAMPLE 2

The procedure of Example 1 was repeated to obtain an ink having the following composition.

| Composition: | |
| --- | --- |
| propylene glycol | 40.0 wt % |
| distilled water | 56.9 wt % |
| Suminol milling black VLG (produced by Sumitomo Kagaku K.K.) | 3.0 wt % |
| Dioxine | 0.1 wt % |
| Viscosity: 4.77 c.p.s. (25° C.) | |
| Surface Tension: 48.6 dynes/cm (25° C.) | |

The jet recording was conducted by using the apparatus employed in Example 1 having the following parameters and added with the above ink composition. As a result, good results were obtained similarly to those of Example 1.

| Parameters: | |
| --- | --- |
| printing rate | 1408 dots/sec |
| static pressure | 0.006 psi |
| peak pulse pressure | 8.06 psi |
| pulse voltage | 120 V |
| pulse width | 130 $\mu_s$ |
| orifice diameter | 0.0046 inches |

EXAMPLE 3

The procedure of Example 1 was repeated to obtain an ink having the following composition.

| Composition: | |
| --- | --- |
| glycerine | 10.0 wt % |
| ethylene glycol | 52.0 wt % |
| distilled water | 29.9 wt % |
| Nigrosine | 8.0 wt % |
| Dioxine | 0.1 wt % |
| Viscosity: 10.9 c.p.s. (25° C.) | |
| Surface Tension: 47.9 dynes/cm (25° C.) | |

The jet recording was conducted by the use of the apparatus of Example 1 having the following parameters and applied with the above ink composition. As a result, good results were obtained similarly to those of Example 1, with a higher print density.

| Parameter: | |
| --- | --- |
| printing rate | 1754 dots/sec |
| static pressure | 0.006 psi |
| peak pulse pressure | 5.74 psi |
| pulse voltage | 80 V |
| pulse width | 140 $\mu_s$ |
| orifice diameter | 0.0028 inches |

EXAMPLE 4

The general procedure of Example was repeated for the preparation of an ink having the following composition.

| Composition: | |
| --- | --- |
| diethylene glycol | 43.0 wt % |
| distilled water | 52.8 wt % |
| Kayarus Turquoise Blue GL (produce of Nippon Kayaku K.K.) | 3.0 wt % |
| Kayarus Supra Blue FF2GL (product of Nippon Kayaku K.K.) | 1.0 wt % |
| Surfactant FC-430 (product of 3M Co.) | 0.1 wt % |
| dioxine | 0.1 wt % |
| Viscosity: 7.00 c.p.s. (25° C.) | |
| Surface Tension: 23.5 dynes/cm (25° C.) | |

Then, the jet recording was conducted by the use of the apparatus of Example 1 having the following parameters and applied with the above ink composition. As a result, good results were obtained similarly to those of Example 1, with blue in print color.

| Parameters: | |
| --- | --- |
| printing rate | 1724 dots/sec |
| static pressure | 0.006 psi |
| peak pulse pressure | 4.71 psi |

| -continued | |
|---|---|
| pulse voltage | 65 V |
| pulse width | 140 $\mu_s$ |
| orifice diameter | 0.0028 inches |

EXAMPLE 5

The procedure of Example 1 was repeated to obtain an ink having the following composition.

| Composition: | |
|---|---|
| ethylene glycol | 75.0 Wt % |
| distilled water | 20.9 Wt % |
| Nigrosine | 4.0 Wt % |
| Dioxine | 0.1 Wt % |
| Viscosity: 10.4 c.p.s. (25° C.) | |
| Surface Tension: 49.4 dynes/cm (25° C.) | |

The ink jet recording was conducted by the use of the apparatus of Example 1 having the following parameters and applied with the above ink composition. As a result, good results were obtained similarly to those of Example 1.

| Parameters: | |
|---|---|
| printing rate | 1369 dots/sec |
| static pressure | 0.006 psi |
| peak pulse pressure | 7.42 psi |

| -continued | |
|---|---|
| pulse voltage | 110 V |
| pulse width | 130 $\mu_s$ |
| orifice diameter | 0.0039 inches |

We claim:

1. In an ink jet printing method, the improvement comprising using, as the printing ink, an ink composition consisting essentially of
   a water soluble dye in an amount of 2-12 weight %, and
   a mixed solvent consisting of water and 40-80% by weight of said composition of a polyhydric alcohol selected from the group consisting of ethylene glycol, propylene glycol, trimethylene glycol, glycerine, 1,3-butanediol, 2,3-butanediol, 1,4-butanediol, diethylene glycol, 1,5-pentanediol, hexylene glycol, triethylene glycol, dipropylene glycol and 1,2,6-hexanetriol,
   said composition having a viscosity of 4 to 20 centipoises at 25° C.

2. In the ink jet printing method of claim 1, wherein the ink composition further consists of 0.01-1 wt % of an antiseptic.

3. The ink jet printing method of claim 2, wherein the antiseptic in the composition is dioxine.

4. The ink jet printing method of claim 2, wherein the composition further consists of 0.05-1 wt % of a nonionic surface active agent.

* * * * *